United States Patent [19]
Atwood

[11] Patent Number: 6,007,711
[45] Date of Patent: Dec. 28, 1999

[54] DIVERTER ASSEMBLY FOR FUEL FILTER

[75] Inventor: Richard E. Atwood, East Hampton, Conn.

[73] Assignee: Stanadyne Automotive Corp., Windsor, Conn.

[21] Appl. No.: 09/057,919

[22] Filed: Apr. 9, 1998

[51] Int. Cl.[6] .................................................. B01D 35/18
[52] U.S. Cl. ..................... 210/136; 210/136; 210/149; 210/249; 210/439; 210/440; 123/514; 123/557
[58] Field of Search ..................................... 210/136, 149, 210/209, 249, 418, 433.1, 438, 439, 440, 444; 123/514, 557; 236/48 R, 93 R, 101 E

[56] References Cited

U.S. PATENT DOCUMENTS

| | | | |
|---|---|---|---|
| 4,574,762 | 3/1986 | Muller et al. | 123/510 |
| 5,685,278 | 11/1997 | Bradford et al. | 123/514 |

*Primary Examiner*—Matthew O. Savage
*Attorney, Agent, or Firm*—Alix, Yale & Ristas, LLP

[57] ABSTRACT

The base assembly of a fuel filter assembly includes a base member and a bimetallic disc. The base member has a fuel supply inlet for receiving a flow of new fuel from a fuel tank and an inlet plenum in fluid communication with the fuel supply inlet and the filter cartridge. The base member also has an excess fuel inlet for receiving a flow of excess fuel from the fuel injection pump, an excess fuel outlet in fluid communication with the fuel tank, and a fuel passage providing fluid communication between the excess fuel inlet and the excess fuel outlet. The bimetallic disc is disposed in the fuel passage adjacent an opening in the wall separating the fuel passage from the inlet plenum. The edge portion of the bimetallic disc is flexed away from the wall to open the opening when the temperature of the excess fuel is below a predetermined value, warming the new fuel to prevent formation of wax crystals. The bimetallic disc is flexed to engage the wall, closing the opening, when the temperature of the excess fuel is above the predetermined value. When the opening is open, the differential pressure between the excess fuel and the new fuel causes the excess fuel to flow from the fuel passage into the inlet plenum and prevents backflow of new fuel through the opening.

21 Claims, 4 Drawing Sheets

DIVERTER ASSEMBLY FOR FUEL FILTER

BACKGROUND OF THE INVENTION

This invention relates generally to fuel filters employed in connection with internal combustion engines. More particularly, the present invention relates to fuel filters and lubricating oil filters having a replaceable cartridge for removing foreign particles and/or separating water from the fuel supply or oil system of an internal combustion engine. The cartridge is secured to a base assembly that is fixedly mounted to the engine header or some other fixed location.

The absence of high standards of quality control in diesel fuel supplies dictates that an effective fuel filter be incorporated into the fuel supply system of a diesel engine. It is not uncommon for diesel fuel to have significant quantities of abrasive particles and water. The abrasive particles present the potential for permanent damage to components of the fuel injection pump. The abrasive particles can also adversely affect the performance of the pump by destroying the ability of the fuel injection pump to precisely meter and deliver fuel at high pressures. The presence of water in the diesel fuel supply can cause corrosion of engine components, and during freezing conditions, can result in interruption of the fuel injection system and/or seizure of moving components. Similarly, water and particulate matter in the lubricating oil must be removed to minimize wear of engine parts.

Conventional diesel fuel delivery systems often require a heat source to prevent formation of wax crystals during cold weather conditions. One type of conventional diesel fuel delivery system includes a heating element in the fuel path of the base which warms the fuel before it enters the filter cartridge. On warm days or after sustained engine operation, substantially less heating of the fuel is required than during start-up on days when the ambient temperature is, for example, 30 degrees below zero F. Consequently, such heating elements require a positive control, either by a relatively simple thermal switch, or by a complex electronic control system.

Another type of conventional diesel fuel delivery system utilizes the return flow from the fuel injection pump to heat the fuel drawn from the fuel tank. One such conventional system utilizes a bimetallic disc which is positioned adjacent an opening which provides fluid communication between the return flow path and the fuel supply flow path into the filter element. The bimetallic disc positively engages a first seal surface in one direction of flexure to divert all of the return flow into the filter element when the return flow temperature is below a predetermined value. When the return flow temperature is above the predetermined value, the bimetallic disc flexes in the opposite direction to engage a second seal surface and thereby close the opening. This system generally requires that a check valve be positioned in the opening.

SUMMARY OF THE INVENTION

Briefly stated, the invention in a preferred form is a fuel filter assembly which comprises a base and a disposable filter cartridge. The base includes a base member and a bimetallic disc. The base member has a fuel supply inlet for receiving a flow of new fuel from a fuel tank, an inlet plenum in fluid communication with the fuel supply inlet and the filter cartridge, and a fuel supply outlet in fluid communication with the filter cartridge and a fuel injection pump. The base member also has an excess fuel inlet for receiving a flow of excess fuel from the fuel injection pump, an excess fuel outlet in fluid communication with the fuel tank, and a fuel passage providing fluid communication between the excess fuel inlet and the excess fuel outlet. A wall separating the fuel passage from the inlet plenum has an opening which selectively provides fluid communication between the fuel passage and the inlet plenum.

The bimetallic disc is disposed in the fuel passage adjacent the opening. The edge portion of the bimetallic disc is flexed away from the wall to open the opening when the temperature of the excess fuel is below a predetermined value. The pressure of the excess fuel is greater than the pressure of the new fuel thereby defining a differential pressure across the wall. This differential pressure causes the excess fuel to flow from the fuel passage of the base member into the inlet plenum of the base member when the opening is open. The differential pressure is sufficiently high that it prevents the flow of new fuel from the inlet plenum of the base member into the fuel passage of the base member when the opening is open. Consequently, no flow limiting device is required to prevent backflow through the opening. The flow of warm excess fuel melts and wax crystals that may be present in the flow of new fuel. When the temperature of the excess fuel is above this predetermined value, the edge portion of the bimetallic disc is flexed to engage the wall closing the opening.

The opening includes an outboard segment having a chamfered interior surface. The chamfered surface minimizes flow resistance when the opening is open. The bimetallic disc is mounted to a removable mounting plug. The mounting plug allows the bimetallic disc to be positioned such that the gap between the bimetallic disc and the wall provides an optimal flow of excess fuel. The mounting plug is removable to allow replacement of the bimetallic disc in the event of failure. A check valve is mounted in the fuel passage intermediate the opening and the excess fuel outlet to prevent back flow into the filter assembly. The check valve also prevents the flow of air into the filter assembly from an internal air vent path and from the fuel tank should the connection with the fuel tank ever not be covered by the fuel.

An object of the invention is to provide a new and improved fuel filter system which prevents the formation of wax crystals without the need for a heater element.

Another object of the invention is to provide a new and improved filter base that does not require a flow limiting device to prevent short circuiting of the new fuel flow.

A further object of the invention is to provide a new and improved fuel filter system that automatically maintains the temperature of the fuel above a preestablished temperature threshold without the need for a temperature control circuit.

Other objects and advantages of the invention will become apparent from the drawings and specification.

BRIEF DESCRIPTION OF THE DRAWING

The present invention may be better understood and its numerous objects and advantages will become apparent to those skilled in the art by reference to the accompanying drawing in which.

DETAILED DESCRIPTION OF THE PREFERRED EMBODIMENT

Figure 1:
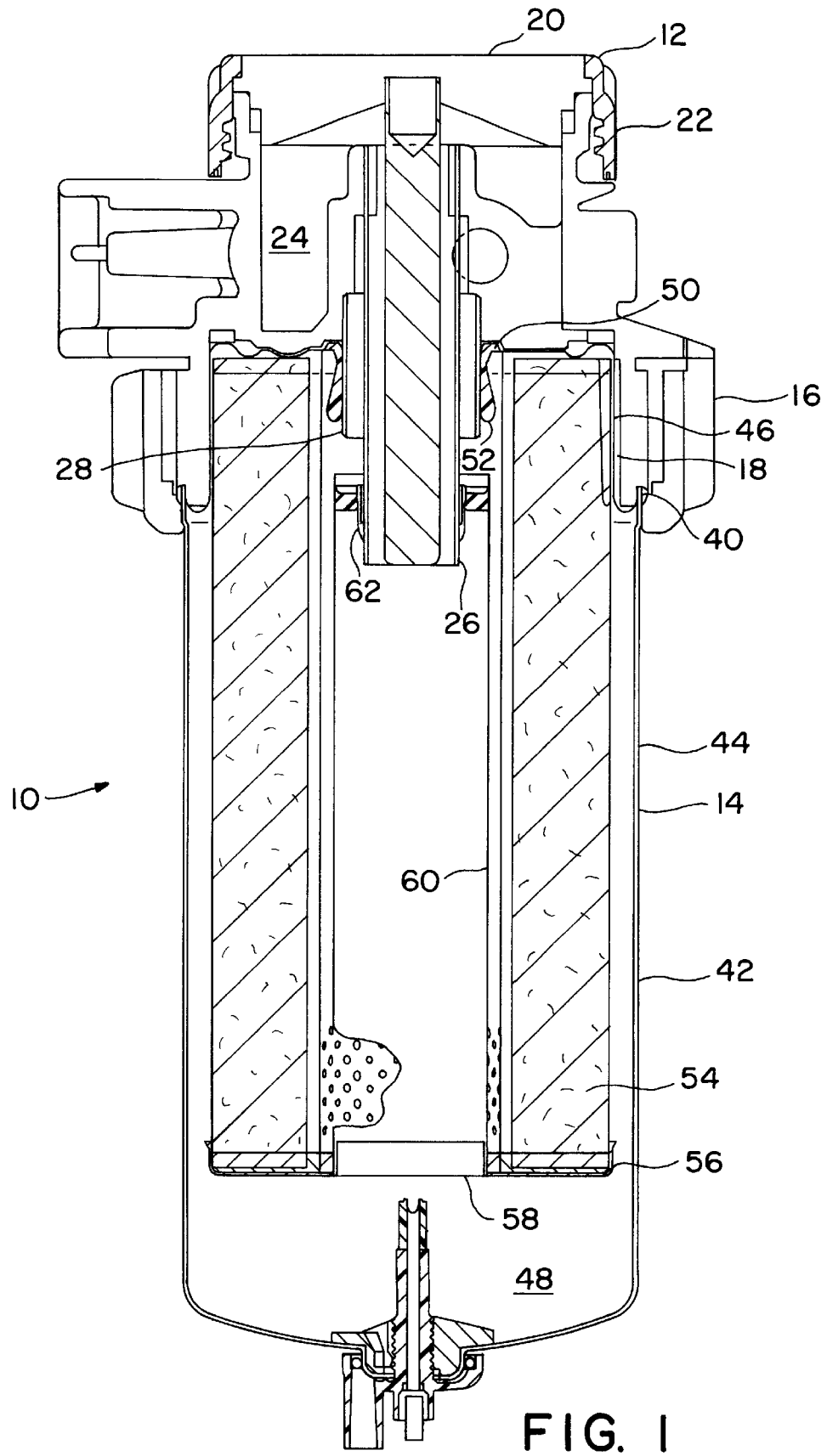
FIG. 1 is a sectional elevational view, partly broken away, of a fuel filter assembly in accordance with the invention.

With reference to the drawings wherein like numerals represent like parts throughout the several figures, a fuel filter assembly in accordance with the present invention is generally designated by the numeral 10. Fuel filter assembly 10 comprises a base 12 and a disposable filter cartridge 14. The base 12 is disposed generally above the disposable filter cartridge 14 which is locked to the base 12 by means of a first retainer collar 16. Alternatively, the base and filter cartridge may be inverted wherein the filter cartridge is disposed above the base. The fuel filter assembly 10 is especially adapted for incorporation into the fuel supply system of an internal combustion engine (not illustrated), such as a diesel engine, for removing particulate matter from fuel and separating the water from the fuel. Filters of this type may also be used to filter impurities from oil in the lubricating system of an internal combustion engine or for other filter applications.

The base 12 and the disposable cartridge 14 may assume a wide variety of configurations. For the disclosed embodiment, the base 12 includes an inverted cup-like receptacle 18 which forms a skirt defining a lower receptacle cavity for upper portions of the disposable cartridge 14. A cap 20 mounted to the top of the base 12 by a second retainer collar 22 defines a reservoir 24 in the upper portion of the base. An elongated sleeve-like first conduit 26 and an outer concentric sleeve-like second conduit 28 provide generally co-axial fluid communication between the base 12 and the disposable cartridge 14.

Figure 2:
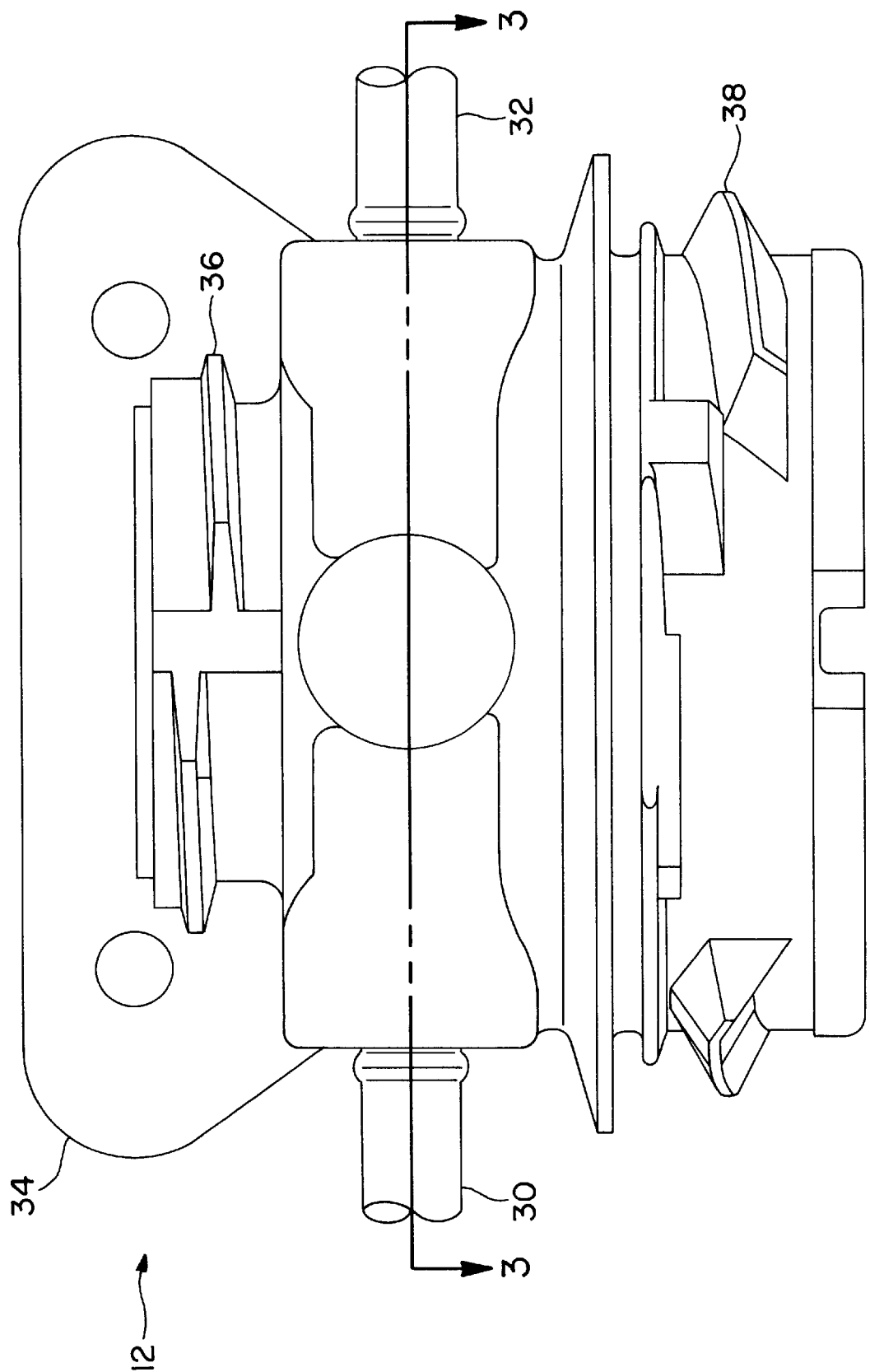
FIG. 2 is an enlarged front view of the base portion of the fuel filter assembly of FIG. 1.
Figure 3:
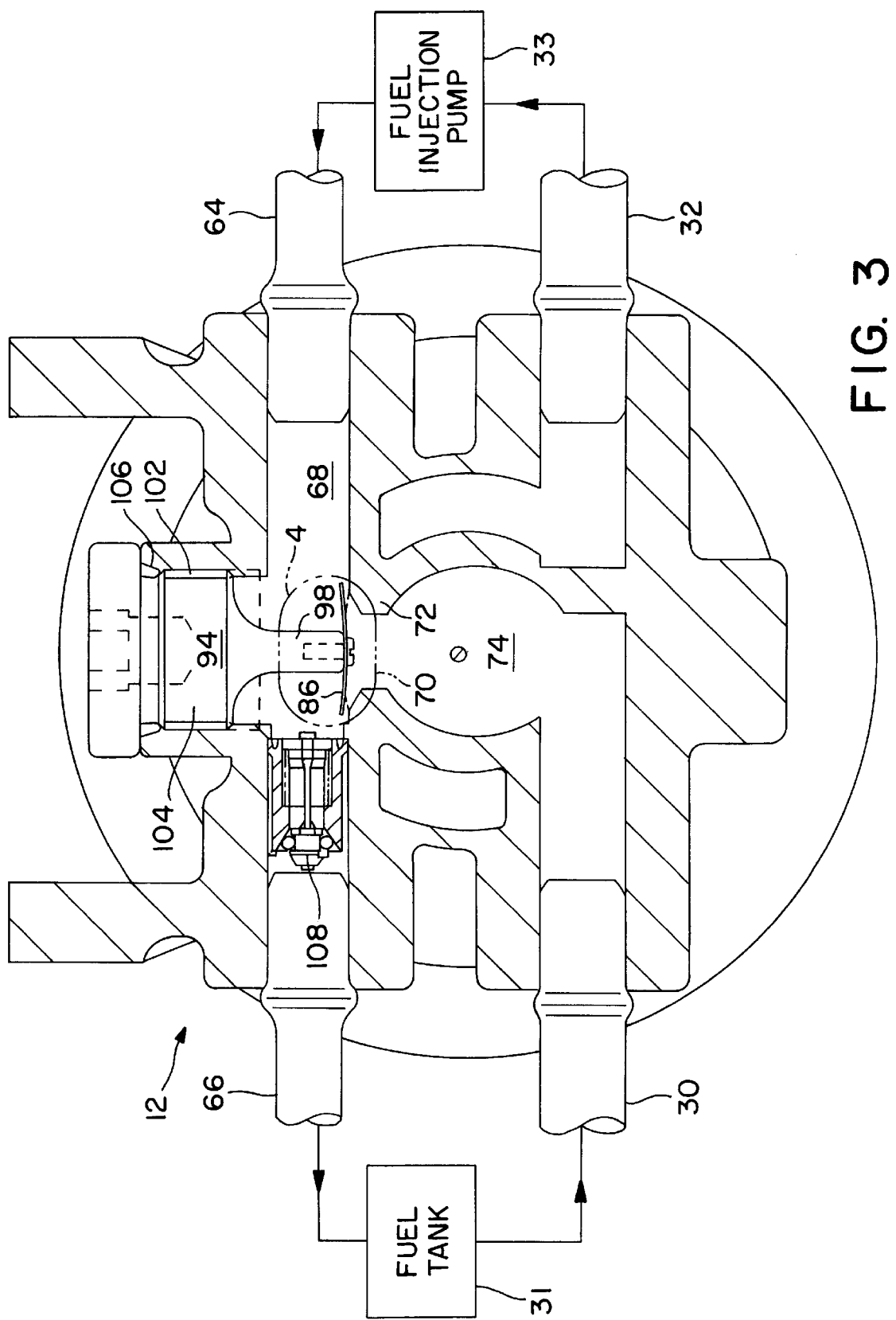
FIG. 3 is a sectional view of the base portion of FIG. 2 taken along line 3—3 together with a schematic flow path for a fuel supply system.
Figure 4:
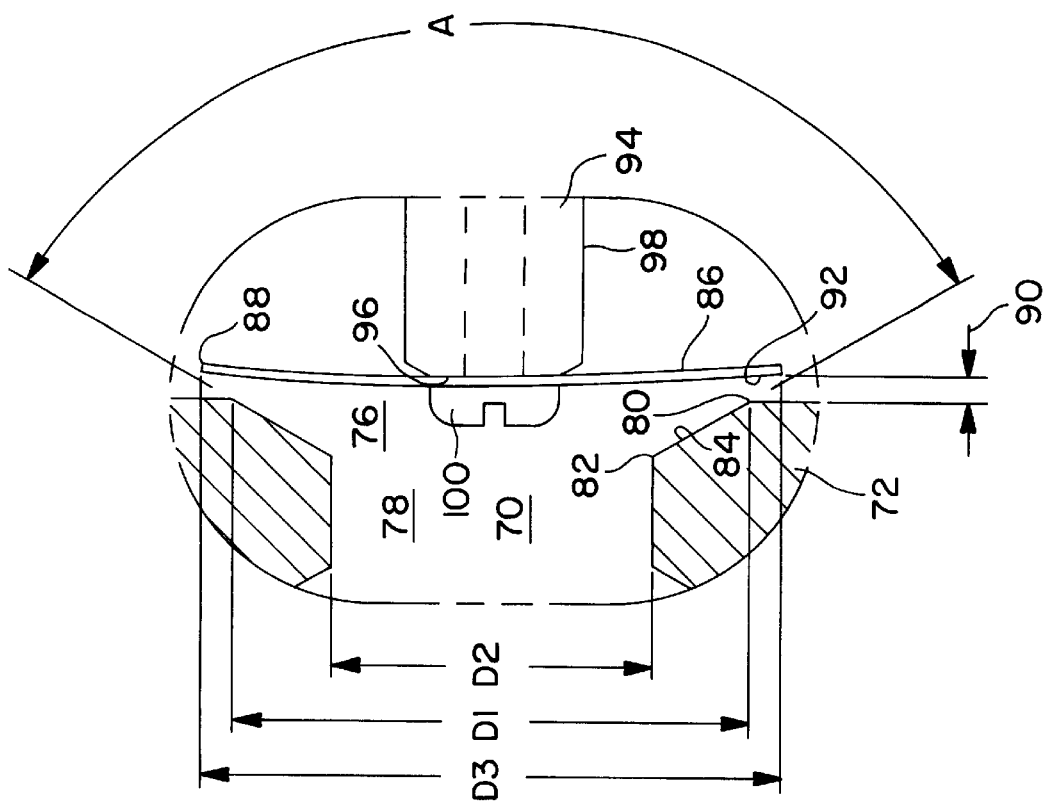
FIG. 4 is an enlarged view, partly annotated to show dimensional relationships, of Area 4 of the base portion of the fuel filter assembly of FIG. 3.

With reference to FIGS. 2–4, an inlet port 30 at an upper side location of the base 12 connects with the fuel tank 31 to ultimately provide fluid communication through the interior passageway defined by the first conduit 26. An outlet port 32 at an upper side location of the base 12 connects with the fuel injection pump 33 to provide external fluid communication from the axial fluid conduit defined between the first and second conduits 26, 28. An integral projecting bracket 34 includes a pair of openings for anchoring the filter base 12 to the engine header extends transversely from the base 12. The base 12 may also have an external air vent (not shown).

The base 12 may include upper and lower pairs of integral outwardly projecting diametrically opposed ramps 36, 38 which ascend in spiral-like fashion around the base 12. The upper ends of the ramps 38 are beveled. Collars 16 and 22 each include a pair of diametrically disposed spiral followers (not shown) which integrally extend inwardly from the collars 16, 22. The followers are dimensioned and positioned for engagement with the ramps 36, 38 so that the followers slidably engage and ascend the ramps 36, 38 upon alignment and angular rotation of the collars 16, 22. Collar 16 includes an inwardly projecting annular shoulder which engages the roll seam 40 of the cartridge 14 for releasably locking the cartridge 14 to the base 12.

With reference to FIG. 1, the disposable filter cartridge 14 comprises a can-like enclosure 42 formed by a pair of opposed lower and upper cup-like sections 44, 46. The sections are joined along a circumferential roll seam 40. A sump 48 is formed at the bottom of the lower section 44 to collect water which coalesces from the fuel. The upper section 46, which is smaller in diameter than the lower section, is received by the base receptacle 18. A central axial opening 50 in the upper section is dimensioned to receive the conduits 26, 28. A sealing grommet 52 mounted at the opening 50 diametrally fluidically seals against the outer conduit 28.

The cartridge 14 may employ a dual stage filter assembly or a single stage assembly as illustrated in FIG. 1. A filter element 54 which has a continuous fan-shaped pleated configuration is mounted in the enclosure. The lower end of the element 54 is engaged by a medial plate 56 having a central opening 58. A tubular conduit 60 extends upward from the medial plate 56. The tubular conduit 60 upper end defines a flange. A second sealing grommet 62 mounted to the flange receives and diametrally seals against the lower end of the base first conduit 26.

The unfiltered fuel enters the fuel filter assembly 10 through the fuel inlet port 30 and the filtered fuel exits the filter through the outlet port 32. It will be appreciated that the fuel flow path initially axially traverses through the interior of the inner conduit 26. The circulation path extends generally axially upwardly and generally radially through the filter element 54 with the return flow path traversing between the inner conduit 26 and the outer conduit 28.

Typically, the amount of fuel that is propelled through a fuel injection pump 33 is greater than the flow required by the engine. For example, it is not unusual for a fuel injection pump 33 to provide a flow rate of 30 gallons per hour for an engine that only requires 5 gallons per hour. Generally, conventional fuel systems have returned the flow of excess fuel to the fuel tank 21. The fuel injection pump 33 also generates a large amount of heat which is absorbed by the flow of excess fuel. The subject fuel filter assembly 10 uses the heated excess fuel as a heat source to prevent formation of wax crystals in the fuel during cold weather conditions.

The base 12 of the fuel filter assembly includes an excess fuel inlet port 64, in fluid communication with an outlet of the fuel injection pump 33, and an excess fuel outlet port 66, in fluid communication with the fuel tank 31, which are connected by a fuel passage 68. An opening 70 traversing the wall 72 between the fuel inlet plenum 74 and the fuel passage 68 provides fluid communication therebetween. With reference to FIG. 4, opening 70 includes an outboard throat 76 and an inboard segment 78. The inside diameter (D1) of the outboard end 80 of the throat 76 is greater than the inside diameter (D2) of the inboard end 82 of the throat 76. The chamfered interior surface 84 of the throat facilitates flow of the excess fuel into the opening 70. In the embodiment shown in FIG. 4, D1 is substantially equal to 0.554 inches, D2 is substantially equal to 0.344 inches, and the angle (A) defined by opposite sides of surface 84 is substantially equal to 118°.

A bimetallic disc 86 is disposed in the fuel passage 68 and positioned adjacent the opening 70 to control the flow of excess fuel from the fuel passage 68 into the fuel inlet plenum 74. Bimetallic discs are well known in the automotive art for consistently exhibiting specific degrees of flexure at known temperatures. Generally discs of this type exhibit a flexure in one direction below a predetermined temperature and a flexure in the opposite direction above such temperature.

The bimetallic disc 86 and opening 70 have substantially circular shapes, where the outside diameter (D3) of the bimetallic disc 86 is greater than the inside diameter (D1) of the outboard end 80 of the throat 76. For the embodiment shown in FIG. 4, D3 is substantially equal to 0.625 inches. The bimetallic disc 86 is mounted within the fuel passage 68 such that the perimeter 88 of bimetallic disc 86 is flexed away from wall 72, as shown by the solid line in FIG. 3, (open position) to define gap 90 and provide a flow path through the opening 70 during cold fuel conditions. For this embodiment, gap 90 has a width of 0.026 inches.

When the fuel temperature (Te) is sufficiently high to prevent formation of wax crystals, the perimeter 88 of the bimetallic disc 86 is flexed toward the wall, as shown by the dotted line in FIG. 3, and the edge portion 92 of the disc 86 engages wall 72 (closed position). In the embodiment of FIG. 4, disc 86 closes gap 90, stopping flow through the opening 70. When the bimetallic disc 86 is flexed away from the wall (open position), the differential pressure between fuel passage 68 and the inlet plenum 74 causes all or almost all of the excess fuel to flow into the inlet plenum 74.

For one preferred embodiment, the bimetallic disc 86 shifts from the open position to the closed position when the temperature of the excess fuel flow from the fuel injection pump 33 is 113° F. (Tp1). It should be apparent that the bimetallic disc 86 will automatically control the temperature of the fuel flow by shifting to the open position whenever the temperature of the excess fuel drops below 59° F. (Tp2). The heat introduced by the warm excess fuel is sufficient to melt an wax crystals that have formed and to prevent the formation of new wax crystals. Therefore, a separate temperature control system is not required.

Figure 5:
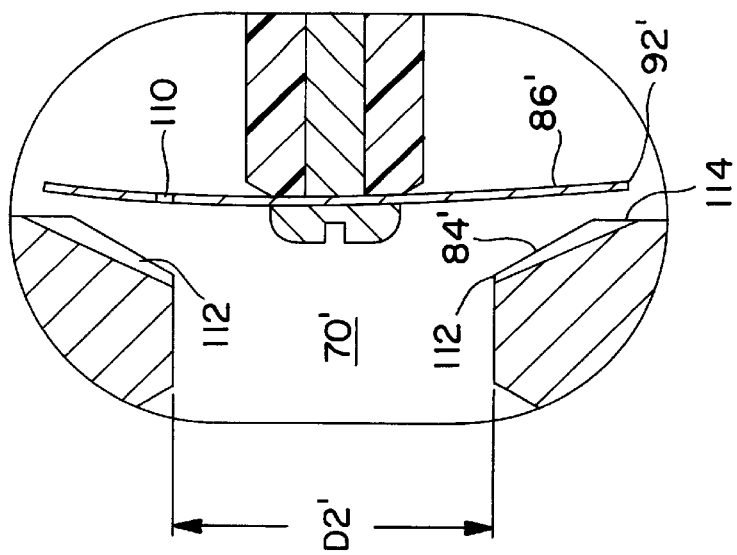
FIG. 5 is an enlarged sectional view of an alternate embodiment of Area 4 of the base portion of the fuel filter assembly of FIG. 3.

The embodiment shown in FIG. 5 is intended to have a minimum flow of excess fuel through the opening 70' when the bimetallic disc 86' is in the closed position to reduce the vacuum at the inlet to the fuel injection pump and to preclude thermal shock when the bimetallic disc 86' moves to the open position. This embodiment also provides a minimum flow of excess fuel through the excess fuel outlet port 66 when the bimetallic disc 86' is in the open position to prevent wax buildup in the return line to the fuel tank.

The flow path for providing the minimum flow of excess fuel through opening 70' may be provided by one or more orifices 110 in the bimetallic disc, one or more channels 112 in the chamfered interior surface 84' of the throat, or a combination of orifices 110 and channels 112. As shown in FIG. 5, the radially outer end 114 of the channels 112 extends beyond the edge portion 92' of the bimetallic disc 86'. Consequently, the channels are not sealed when the bimetallic disc 86' is in the closed position. To ensure that the minimum flow of excess fuel is provided through the excess fuel outlet port 66, the diameter D2' of the opening 70' is reduced to increase the flow resistance. In a preferred embodiment, the diameter D2' of opening 70' is substantially equal to 0.156 inches.

A plug 94 is used to mount the bimetallic disc 86 within the fuel passage 68. The bimetallic disc 86 is affixed to the distal end 96 of the positioning member 98 of a plug by a screw 100 or bolt which extends through the center at the bimetallic disc 86. The bimetallic disc 86 and positioning member 98 are inserted through a mounting port 102 in the base 12 and the body member 104 of the plug 94 is received within the mounting port 102. The outside and inside surfaces of the body member 104 and mounting port 102, respectively, may have corresponding threads to removably mount the plug 94 to the base 12. Alternatively, interlocking flanges and other means known in the art may be used to removably mount the plug 94 to the base 12. The plug 94 is removable to allow replacement of the bimetallic disc 86 if it should malfunction or fail. An O-ring 106 is positioned between the plug 94 and the filter base 12 to provide a fluid-tight seal. The mounting port 102 is positioned opposite the opening 70 such that the bimetallic disc 86 is positioned adjacent the opening 70.

The fuel injection pump 33 typically pressurizes the flow of excess fuel to 6 psi (Pe) and the fuel in the inlet plenum 74 is typically −2 psi (Pn). The differential pressure (Pe−Pn) between fuel passage 68 and the inlet plenum 74 causes all or almost all of the excess fuel to flow into the inlet plenum 74 when the bimetallic disc 86 is in the open position. The differential pressure also ensures that fuel will not flow from the inlet plenum 74 to fuel passage 68. Consequently, a flow limiting device, such as a check valve, is not required to prevent backflow through the opening 70. There is no assurance that the fuel tank return for the flow of excess fuel will be positioned such that the return is always covered by fuel. Consequently, a check valve 108 is mounted within the fuel passage 68 intermediate the opening 70 and the excess fuel outlet port 66 to prevent backflow of air via the excess fuel outlet port 66.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter assembly comprising:
   a base comprising
      a base member having a fuel supply inlet for receiving a flow of new fuel having a pressure Pn, a fuel supply outlet, an inlet plenum in fluid communication with the fuel supply inlet, first and second conduits in fluid communication with the inlet plenum and fuel supply outlet, respectively, an excess fuel inlet for receiving a flow of excess fuel having a temperature Te and a pressure Pe, the pressure of the excess fuel Pe being greater than the pressure of the new fuel Pn, an excess fuel outlet, a fuel passage providing fluid communication between the excess fuel inlet and the excess fuel outlet, separator means for separating the fuel passage from the inlet plenum, the separator means defining an opening providing fluid communication between the fuel passage and the inlet plenum,
      a bimetallic disc disposed in the fuel passage adjacent the opening, the bimetallic disc having a perimeter defining an edge portion, the perimeter of the bimetallic disc being flexed away from the separator means when the temperature of the excess fuel Te is below a predetermined value Tp, the perimeter of the bimetallic disc being flexed toward the separator means when the temperature of the excess fuel is above the predetermined value wherein the edge portion of the bimetallic disc engages the separator means to seal the opening; and
   a filter cartridge engaged with the base, the filter cartridge defining a flow path providing fluid communication between the first and second conduits of the base member, the filter cartridge having at least one filter element which traverses the flow path;
   wherein the pressure of the excess fuel and the pressure of the new fuel define a differential pressure across the separator means, the differential pressure causing the excess fuel to flow from the fuel passage of the base member into the inlet plenum of the base member when the perimeter of the bimetallic disc is flexed away from the separator means and preventing flow of new fuel from the inlet plenum of the base member into the fuel passage of the base member.

2. The filter assembly of claim 1 wherein the base further comprises means for limiting flow, disposed in the fuel passage of the base member intermediate the opening and the excess fuel outlet.

3. The filter assembly of claim 2 wherein the means for limiting flow comprises a check valve.

4. The filter assembly of claim 1 wherein the opening comprises a throat segment adjacent the fuel passage of the base member, the throat segment having an outboard end adjacent said fuel passage and an inboard end adjacent said inlet plenum each having a diameter, the diameter of the outboard end of the throat segment being greater than the diameter of the inboard end of the throat segment, wherein the throat segment has a chamfered interior surface.

5. The filter assembly of claim 4 wherein the chamfered interior surface defines first and second oppositely disposed sides, the first and second sides defining an angle of substantially 118°.

6. The filter assembly of claim 4 wherein the diameter of the outboard end of the throat segment is substantially equal to 0.55 inches and the diameter of the inboard end of the throat segment is substantially equal to 0.34 inches.

7. The filter assembly of claim 6 wherein the bimetallic disc has an outside diameter substantially equal to 0.62 inches.

8. The filter assembly of claim 1 wherein the bimetallic disc and the separator means of the base member define a gap when the perimeter of the bimetallic disc is flexed away from the separator means, the gap having a width substantially equal to 0.02 inches.

9. The filter assembly of claim 1 wherein the base further comprises a mounting port and a mounting plug having a body member and a positioning member, the body member being removably mounted in the mounting port, the bimetallic disc being affixed to the positioning member.

10. A base for a fuel filter assembly comprising:

a base member having a fuel supply inlet for receiving a flow of new fuel, a fuel supply outlet, an inlet plenum in fluid communication with the fuel supply inlet, an excess fuel inlet for receiving a flow of excess fuel, an excess fuel outlet, a fuel passage providing fluid communication between the excess fuel inlet and the excess fuel outlet, a wall separating the fuel passage from the inlet plenum, the wall defining an opening providing fluid communication between the fuel passage and the inlet plenum; and a bimetallic disc disposed in the fuel passage adjacent the opening, the bimetallic disc having an edge portion;

wherein the new fuel has a pressure Pn and the excess fuel has a pressure Pe and a temperature Te, the edge portion of the bimetallic disc being flexed away from the wall to open the opening when the temperature of the excess fuel is below a predetermined value Tp, the edge portion of the bimetallic disc being flexed to engage the wall and close the opening when the temperature of the excess fuel is above the predetermined value Tp, the pressure of the excess fuel and the pressure of the new fuel defining a differential pressure across the wall, the differential pressure causing the excess fuel to flow from the fuel passage of the base member into the inlet plenum of the base member when the opening is open and preventing flow of new fuel from the inlet plenum of the base member into the fuel passage of the base member.

11. The base of claim 10 further comprising a check valve disposed in the fuel passage intermediate the opening and the excess fuel outlet.

12. The base of claim 10 wherein the opening comprises a throat having an outboard end adjacent said fuel passage and an inboard end adjacent said inlet plenum, the outboard and inboard ends each having a diameter, the diameter of the outboard end of the throat being greater than the diameter of the inboard end of the throat, wherein the throat has a chamfered interior surface.

13. The base of claim 12 wherein the bimetallic disc has an outside diameter which is greater than the diameter of the outboard end of the throat.

14. The base of claim 10 wherein the bimetallic disc and the wall of the base member define a gap when the edge portion of the bimetallic disc is flexed away from the wall.

15. The base of claim 10 further comprising a mounting plug having a body member and a positioning member extending to a distal tip, the bimetallic disc being mounted to the distal tip, wherein the mounting plug positions the bimetallic disc such that the bimetallic disc and the wall of the base member define a gap when the edge portion of the bimetallic disc is flexed away from the wall.

16. The base of claim 15 wherein the base member defines a mounting port disposed opposite the opening, the body member of the mounting plug being removably mounted in the mounting port.

17. A base for a fuel filter assembly comprising:

a base member having a fuel supply inlet for receiving a flow of new fuel, a fuel supply outlet, an inlet plenum in fluid communication with the fuel supply inlet, an excess fuel inlet for receiving a flow of excess fuel, an excess fuel outlet, a fuel passage providing fluid communication between the excess fuel inlet and the excess fuel outlet, a wall separating the fuel passage from the inlet plenum, the wall defining an opening providing fluid communication between the fuel passage and the inlet plenum and the excess fuel having a temperature Te;

a positioning member extending into the fuel passage; and a bimetallic disc having a center portion mounted to the positioning member, the bimetallic disc being disposed in the fuel passage adjacent the opening;

wherein the bimetallic disc is flexed to open the opening when the temperature Te of the excess fuel is below a first predetermined value Tp1 and the bimetallic disc is flexed to at least partially close the opening when the temperature Te of the excess fuel is above a second predetermined value Tp2.

18. The base of claim 17 wherein the base further comprises a mounting port and a mounting plug having a body member and a positioning member, the body member being removably mounted in the mounting port, the bimetallic disc being affixed to the positioning member of the plug.

19. The base of claim 17 wherein the bimetallic disc defines at least one orifice extending through the bimetallic disc, the orifice providing a flow path into the opening when bimetallic disc is flexed to close the opening.

20. The base of claim 17 wherein the opening comprises a throat segment adjacent the fuel passage of the base member, the throat segment defining at least one channel providing a flow path into the opening when bimetallic disc is flexed to close the opening.

21. The base of claim 17 wherein the opening has a diameter selected to provide a resistance to flow through the opening whereby a portion of the excess fuel flows through the excess fuel outlet when the bimetallic disc is flexed to open the opening.

* * * * *